March 31, 1953 M. D. McFARLANE 2,633,494

FACSIMILE TRANSMITTING SYSTEM

Filed March 23, 1946

INVENTOR

Maynard D. McFarlane

Patented Mar. 31, 1953

2,633,494

UNITED STATES PATENT OFFICE 2,633,494

FACSIMILE TRANSMITTING SYSTEM

Maynard D. McFarlane, Los Angeles, Calif.

Application March 23, 1946, Serial No. 656,579

5 Claims. (Cl. 179—7.1)

This invention relates to improvements in facsimile transmitting systems, and, in particular, to the control of transmitted signals in phase and time relationship in accordance with the tone of the subject copy to be transmitted. This invention in the preferred embodiment here described and illustrated relates to the transmission of black-and-white original subject copies.

In methods of facsimile transmission used heretofore, particularly methods employing a sub-carrier signal for the transmission of the facsimile intelligence, an alternating current signal of a specified frequency or within a specified range of frequencies is used as the sub-carrier signal for the transmission of the intelligence. This frequency may be generated, for example, by a chopper acting through the optical system, or it may be generated by an electronic oscillator or other device suitable for the production of a train of oscillating waves. In systems employing an optical chopper, the speed of this chopper is normally constant, and this speed may bear a definite relationship to the rate of scansion, or it may be independent of this rate. In previously known systems, the optical chopper is inserted in the light path between the light source and the photoelectric cell and is continuously operating: it is so arranged that a variation in the shading of the original subject copy produces modulation of the intensity of the light beam, each signal at the chopper-controlled frequency being of an amplitude corresponding to the tone shading of an individual unit area of the original subject copy. The resultant photoelectric cell output is an alternating current signal of frequency controlled by the chopper and of amplitude controlled by the intensity of the shading of the subject copy at each individual point of scansion, this is, the shading of each unit area of the original subject copy.

Where the alternating signal, which may be of the sub-carrier variety, is provided from an oscillatory source such as a vacuum tube oscillator, the usual arrangement heretofore has been the provision of a modulating element (usually a vacuum tube or tubes) whereby a suitable signal (which may be in the form of an undulating direct current signal) from the photoelectric cell or its associated circuit elements is caused to modulate the amplitude or frequency of the oscillatory signal so that the resulting output is a signal which is modulated in respect to amplitude or frequency by electric currents corresponding to the tone shading of individual areas of the original subject copy.

When these existing systems, either of the chopper or modulator type, are used for the transmission of original copy which is black and white only, and which comprises no intermediate tone shadings, false tone signals may occur at the start and at the conclusion of a black segment on a white background or white segment on a black background or the original subject copy. Due to the finite aperture size necessarily employed, the light intensity striking the photoelectric cell as the scanning proceeds from black to white or white to black is translated gradually from a minimum to a maximum or maximum to minimum, as the case may be. As these translations are superimposed upon either the chopper frequency or the oscillatory frequency, there results a random relationship between the individual cycles of the said frequencies and the modulating signal which corresponds to the variation in tone shading occasioned by the transfer of tone value. In a system which is adapted to transmit and record tone shadings, this results in an intermediate signal value being transmitted over the transmission circuit at such times as this effect occurs, and in the reproduction on a variable density reproducer of a tone of intermediate value between black and white corresponding to the intermediate value of the transmitted signal.

However, black-and-white transmissions may be achieved over circuits which are not susceptible to the transmission of intermediate tone shadings. The elimination of the intermediate tone shading for black-and-white transmissions increases the efficiency of the circuit and permits the handling of a greater amount of copy in a given time. With on-off transmissions, as may be employed in such black-and-white transmissions, circuits have in the past been employed to eliminate the signals corresponding to intermediate tone shadings. These circuits may comprise a combination of limitors, square wave networks, and other signal shaping devices. The resultant output from these devices is a train of waves of constant amplitude and predetermined frequency whose start is controlled by the combined effect of any shaping network that may have been employed and the random relationship of the phase of the chopper or oscillatory frequency to the true arrival time of the white-to-black or black-to-white transition before the scanning mechanism. This means that the recorded signal will start in some spatial relationship in respect to its correct position, the displacement of which depends upon the phase angle above discussed.

One feature of this invention, therefore, is directed to correcting this displacement. In a device constructed in accordance with a preferred embodiment of my invention, the signal frequency, be it sub-carrier or carrier, is initiated by the transition from black-to-white or white-to-black, as the case may be. While this may result in a slight time displacement between the transmitter and receiver signal positions, this displacement is uniform throughout the whole transmission and results in a more correct rendering of the physical outlines of the black-and-white original subject copy than is possible by means in prior usage. The desired initiation of the transmitted signal may be effected by so controlling the chopper that its operation is interrupted and related to the transition in black and white scansion of the original subject copy, or alternatively, in the case of an oscillator, this may be effected by shock-excitation of the oscillator into operation by the transition in black and white scansion, either with or without the interposition of any shaping networks. By a correct control of the circuits, it is possible to dispense with shaping networks as heretofore used, and one aspect of the invention is directed to that end.

Previously it has been proposed to control the initiation of a tone signal within the space of time allotted for the transmission of a signal corresponding to a unit area of the original subject copy, so that the tone value of such a unit area is determined solely by a time element within the time of the transmission of a unit area, as defined in my Patent No. 2,070,913, dated February 16, 1937. This is to be clearly distinguished from the control of the initiation of a train of waves in accordance with the present invention; said train being here initiated not within the scansion time of a unit area, but actually to determine the unit area disposition irrespective of tone values except for changes from black to white and white to black of the original subject copy. The method previously disclosed relates to time elements within a predetermined unit area pattern, while the method here disclosed controls the unit area pattern in accordance with the transitions of the original subject copy. According to the embodiment of the invention presented here, control is exerted for black and white subject matter and not for subject material having tone variations therein.

Another object of my invention is to dispense with the transmission of signals other than those representing values of tone of the original subject copy in the black and white category. It is clear that these signals may be sub-carrier signals to be subsequently modulated upon a carrier circuit, or they may themselves be carrier signals of the requisite frequency and therefore be transmitted directly: an object of this invention is therefore to secure this arrangement of signals, either as carrier or sub-carrier frequencies for transmission.

By the elimination of intermediate tone signals, the band width necessary for the transmission of facsimile intelligence is very considerably narrowed. One object of my invention is to take advantage of this narrowed band width by economizing in line transmission time, or, alternatively, by increasing the amount of subject detail transmitted in a given transmission time. Other objects of my invention will be evident from inspection of the following detailed specification and of the drawings annexed hereto, which drawings are appended for purposes of illustration only, and which embody certain preferred forms of the invention but do not limit the scope thereof.

Figure 1:
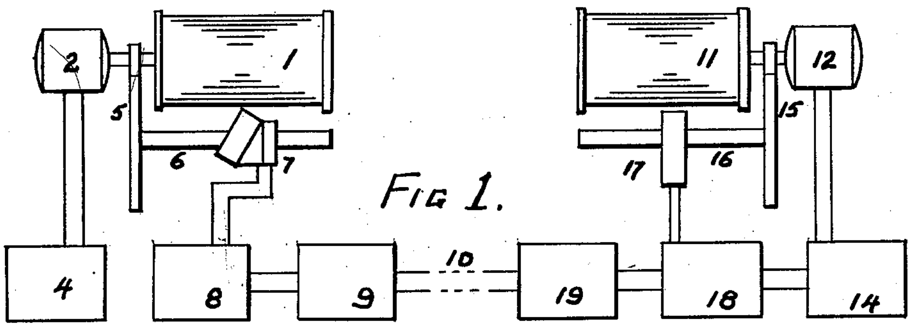
Figure 1 is a schematic illustration of a facsimile system according to this invention.

Figure 1 illustrates a transmitting mechanism at the left and a receiving mechanism at the right. At the transmitter a cylinder 1 is driven by a motor 2 through suitable gearing (not shown). The speed of the motor 2 may be controlled by a motor control unit 4. Gearing 5, between the drum 1 and the lead screw 6 controls the transversing of the scanning unit 7, which may comprise a light source and photoelectric cell in operative placement and provided with a suitable optical system. The electric signal from the photoelectric cell in the unit 7 is passed to the signal generator 8 and thence to the amplifier 9, which amplifier may be of any suitable type adapted to put the signal upon a wire line or upon a radio transmitting circuit. The dashed lines 10 represent the communication channel; this may be a wire line, but it is to be understood that my invention is not limited to the use of a wire line for signal transmission between the transmitter and receiver, and that the circuit 10 may be replaced by a radio link or other suitable communication means without departure from the spirit of my invention.

At the receiving station the drum 11 is driven by the motor 12 which may be controlled by the motor control unit 14. This motor control unit may itself be controlled from the motor control unit 4 at the transmitter, or it may be an independent control. If desired, signals may be transmitted over the circuit 10 which will control the speed and/or the phase relationship of the transmitting and sending drums 1 and 11 by a suitable control exercised upon the motor control unit 14. The incoming signals from the line 10 may be amplified by the amplifier 19 and passed to the control unit 18, in which they may be rectified or otherwise rendered suitable for the operation of the recording device 17. This recording device is caused by means of the lead screw 16 and gearing 15 to scan the surface of the receiver cylinder 11 in a helical path of scansion corresponding to the scansion of the unit 7 across the drum 1 of the transmitter.

The operation of the apparatus illustrated in Figure 1 is as follows: the motor 2 causes the drum 1 to rotate, and the lead screw 6 through the gearing 5 transverses the scanning unit 7 over the surface of the original subject copy which has been placed upon the drum 1. The photoelectric cell output from the unit 7 is amplified (if required) and is caused to operate one of the transitron or shock-excited circuits described below, and which is in the signal generator unit 8. The output from the signal generator unit 8 is therefore a series of wave trains of full amplitude, whose start and finish correspond to the placement of the transition between black and white of the original subject copy on the drum 1 as scanned by the unit 7. After transmission and amplification by the amplifier 19, (if required), the received signal trains pass to the control unit 18, where they may be rectified, doubled, or otherwise treated in any suitable manner to effect the recording through the agency of the unit 17. If this unit 17 is of the galvanometer type, A. C. signals may be used therein; or the signals may be rectified and the envelope applied to the galvanometer. A recording glow lamp may be used in the device 17, in which case the control unit 18 may feed out the desired signal which may be in the form of rectified pulses or may be an envelope of the complete signal. Due to the similarity between the mechanical arrangements of the receiver and the transmitter and to the motor control which is exercised for maintenance of speed and for correct phase, the unit 17 is caused to scan the recording surface of the cylinder 11 in a corresponding manner to the scansion of the unit 7 over the surface of the cylinder 1 at the transmitter.

Figures 2, 3, 4, 5, 6, 7, 8:
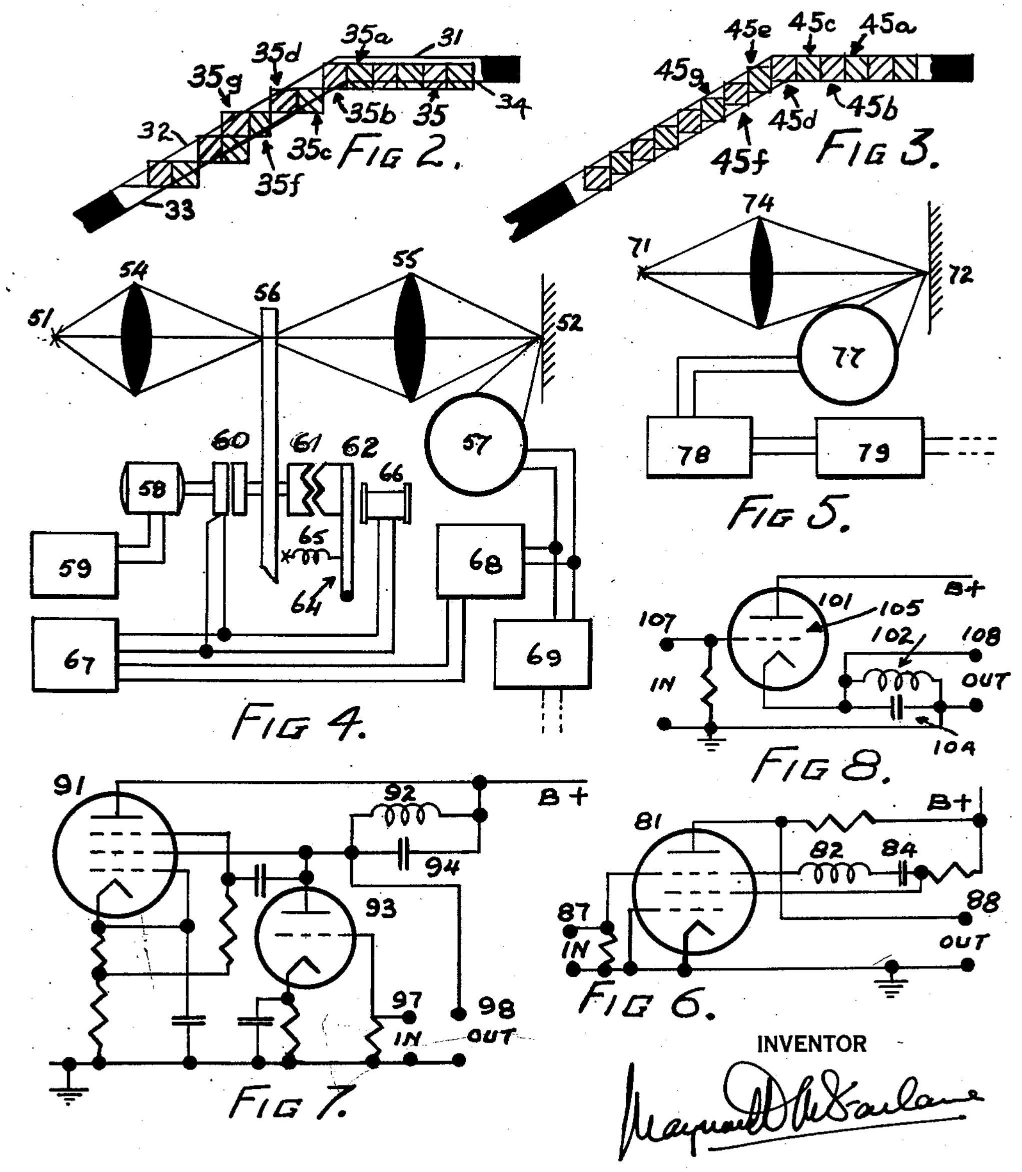
Figure 2 illustrates a type of reproduction with prior systems.
Figure 3 represents a reproduction of the same subject copy transmitted in accordance with my invention.
Figure 4 is an illustration of a chopper control means for carrying out the purposes of this invention.
Figure 5 is a block diagram of a signal generator circuit operating in accordance with this invention.
Figure 6 shows a schematic diagram of a controlled transitron circuit adaptable to the purposes of this invention.
Figure 7 illustrates a schematic diagram of another form of transitron circuit.
Figure 8 is a schematic representation of a shock-excited oscillator employed according to this invention.

In Figure 2 is illustrated a line, a facsimile of which is to be transmitted. This line is so arranged in relation to the chopper or oscillator frequency and the scanning speed that a succession of oscillator signals appear with a front parallel to the portion of the line to the right of the bend. In this figure, for purposes of illustration only, it is to be considered that the line is black although only the end portions thereof are so marked. To delineate the boundaries of this black line, the lines 31, 32, 33, and 34 have been drawn, it being understood that the area enclosed in these four lines is scanned as black by the optical unit.

The thickness of the line illustrated in Figure 2 is approximately the width of one unit area; i. e., for correct reproduction, accurate transmission and placement of a single unit of the carrier or sub-carrier frequency as desired. As shown, therefore, a single unit of the type illustrated as 35 represents this line upon the reproducing surface.

Examination of Figure 2 discloses that there is a discrepancy (due to a time lag) between the placement of the unit areas 35*a* and 35*b*, for example, and the leading edge of the line illustrated by the outline 31. This displacement as described above is due to the fact that the signal generator in this particular case is assumed to be out of phase with the transition signal, and that therefore the recorded signal cannot be placed until a peak of the signal generator signal has been reached. Examination of the sloping portion of the line to be recorded shows further that certain relationships may exist between the unit area signal and the black and white transition signal, with the result that there is an overhang and two unit areas are recorded, as as 35*c* and 35*d*, 35*f* and 35*g*. The left-hand portion of Figure 2 shows a mosaic of recorded signals built up in the form of steps, each step consisting of a full signal width and also comprises double signals at points where the edge of each step overlaps the edge of the recorded line.

It is to be noted that in this figure an illustration has been chosen in which there is a fixed relationship between the frequency of the oscillator or other device producing the signals 35 and the speed of rotation of the drum 1 at the transmitter so that the front presented by the adjacent signals is parallel to the line 31. This is not necessarily the case in all equipments, and various and changing relationships may in practice exist. Where these exist, other configurations than that shown in Figure 2 will result, but in general the situation will be similar as there will be some relationship between the scanning factors and the angle of the line which will produce a result of the type shown in Figure 2.

In Figure 3 is shown a similar bent line to that shown in Figure 2. Also shown in Figure 3 are unit recorded areas 45*a*, 45*b*, 45*c*, 45*d*, 45*e*, 45*f*, and 45*g*. The recording effected in Figure 3, however, is carried out by means of a start-stop signal generator as has been above described, and as is illustrated in some of the other figures herein. A feature of this start-stop signal generator is that the train of signals corresponding to any particular transition from black to white or from white to black is started in a definite phase relationship to that transition. Thus the leading edges of the signals 45*a*, 45*b*, 45*c* and 45*d* coincide with the leading edge of the line, and the signals 45*e*, 45*f* and 45*g* are displaced a small amount only in order that the condition of transition may be met. In other words, the displacement of one unit, for example 45*e* from 45*d* is not the displacement of a complete cycle or half-cycle of the sub-carrier or carrier frequency, but is only such portion of a cycle as is represented by the time difference in the transition due to the slope of the line at that point.

Examination of Figure 3 will further show that under the circumstances illustrated no double signal is produced, and that the stepped increments due to the slope of the line are smaller than those of the corresponding portion of Figure 2. The resultant effect of Figure 3 is a more faithful reproduction of both the horizontal and inclined portions of the line.

It is to be noted that in both Figures 2 and 3 the effect discussed is produced by a signal on black. It is pointed out that a similar result is obtainable by inversion where a signal on white is required and a white line is to be reproduced. The same principles illustrated in Figures 2 and 3 can thus be applied to any transition from black to white or white to black.

In Figure 4 is shown a start-stop signal generator of a type in which a rotating chopper mechanism may be employed according to this invention. It is pointed out that the device illustrated in Figure 4 is for purposes of illustration only, and that the invention is not limited to the actual construction there shown.

In Figure 4 a light source 51 is imaged onto the surface of the original subject copy 52 by means of lenses 54 and 55. The optical system comprising these lenses 54 and 55 may be so arranged that there is an optical crossing point between the lenses, and at this point the chopper disc 56 is arranged to cut the beam. The disc 56 is shown in this illustration as an edge view, but it may comprise a circular disc having therein slots or holes of the type well known in the art. A suitable form of chopper disk is shown in my Patent No. 2,164,038, dated June 27, 1939. Light reflected from the surface of the original subject copy 52 is directed to the photoelectric cell 57.

The disc 56 is adapted to be driven by the motor 58, which is itself controlled by the motor control 59. The drive between the motor 58 and the disc 56 may be through the magnetic clutch 60. Also attached to the disc 56 is the serrated clutch 61 adapted for engagement with the stationary serrations of the unit 62 on the arm 64. Under normal operating conditions, with a white surface of the original subject 52 being scanned, the member 62 is engaged with the surface of 61 by means of the pivoted arm 64 and a spring 65 co-acting to secure engagement. The serrations of the member 61 are so located in relation to the apertures in the disc 56 that the latter will be stopped with an aperture in the path of the light beam.

An electromagnet 66 is arranged adjacent to the arm 64 and is adapted to release the unit 62 from engagement with the member 61 against the action of the spring 65. As shown in this embodiment of this device, the electromagnet 66 is energized at the same time as the magnetic clutch 60 is energized. This may be performed through the clutch amplifier 67, which is controlled by the control unit 68 which is so coupled to the photoelectric cell unit 57 that it will cause the clutch amplifier 67 to operate the magnetic clutch 60 and the releasing electromagnet 66 whenever a transition occurs at the surface of the original subject copy 52, i. e., when the tone changes from white to black.

The motor 58 continues to drive the chopper 56 while the black material on the original subject copy 52 is being scanned. As soon as another transition occurs and the copy 52 becomes white, the output of the photoelectric cell unit 57 will rise, the control unit 68 will reduce the output of the clutch amplifier 67, which will release the magnetic clutch 60 and the magnet 66. Release of the clutch 60 and magnet 66 allows the member 62 to engage the unit 61 under the influence of spring 65, resulting in stoppage of the disc 56 with an aperture in the path of the light beam. The cycle of operations may then be repeated. The line amplifier 69 transmits to a line or to a radio or other communication circuit impulses generated in the photoelectric cell unit 57. It is to be noted that during the traverse of a white section before the optical beam there will be no alternating signal transmitted by the line amplifier because the disc 56 is then held stationary and the output of photoelectric cell is a direct current. When there is a black section of the original subject copy in the path of the light beam, an alternating current signal will be generated through the action of the chopper disc 56 and this signal may be transmitted to the line by the line amplifier 69. Alternatively, the unit 57 may be arranged in such a fashion that a strong signal will be delivered while black is being scanned, and a weak signal on white. The other circuits may then be arranged accordingly.

While a rotating chopper form of light interrupter has been here illustrated, it is pointed out that an exactly analogous arrangement may be effected by the use of a vibrating chopper device, that is one in which the light beam is interrupted by a vibrating member which may be electromagnetically controlled. Also the same effect may be secured by the use of a Kerr cell, the control of this cell being however electrical. The Kerr cell adaptation may use in part portions of the devices according to both Figure 4 and Figure 5.

Figure 5 illustrates an arrangement of an optical system and start-stop signal generator in which electronic circuits are used in place of the chopper device illustrated in Figure 4. Light from a source 71 is focussed by means of a lens 74 onto the surface 72 of the original subject copy. Reflected light from this surface is picked up by the photoelectric cell 77 which is adapted to control the start-stop signal generator 78 in the production of trains of oscillatory waves corresponding to the space between the transitions from black-to-white-to-black, or white-to-black-to-white of the original subject copy 52. The output from the signal generator 78 may be amplified by the line amplifier 79 and thereby transmitted to the line or over a radio circuit or other communication channel as may be required.

Figure 6 illustrates a transitron oscillator which may be triggered by a negative signal to produce a train of waves. The tube 81 (here shown as a pentode) is supplied with a negative signal on its suppressor grid through the input circuit 87. The negative signal on this grid causes the tube 81 to oscillate at a frequency determined by the characteristics of the tuned circuit comprising the inductance 82 and the capacitor 84, which are connected across the suppressor and screen grids of the tube. The resultant oscillations appear at the output 88, and as these oscillations are triggered by the negative signal at the input 87, they are maintained for as long a period as the input signal remains negative.

From examination of the circuit of Figure 6 it may be seen that the peak of the first half-cycle of the train of oscillations produced by this transitron device will occur at an exact period of the time after the input signal reaches a predetermined negative value, so that it is established that a signal will be transmitted to the line or radio circuit or other communication channel at a precise time after the occurrence of a tone transition from black to white or white to black, as the case may be. Also this time interval will be the same for each similar transition. By proper circuit design the time lag occasioned may be rendered negligible, or may be compensated by a suitable adjustment of the phasing mechanism since the time interval is the same in the case of each transition.

Figure 7 illustrates a similar circuit in which the tube 91 (also arranged as a transitron oscillator) is controlled by means of the switching tube 93. A signal in the input circuit 97 causes the tube 93 to change its state, and by its abrupt change of state this tube throws the transitron oscillator 91 into a train of oscillations whose frequency is determined by the combination of the inductance 92 and the capacitor 94. The output circuit 98 carries a train of waves of the required frequency whose phase with respect to the incoming signal in the circuit 97, and therefore with respect to the transition from black to white or white to black, is a known quantity. It is pointed out that a consistent phase displacement applicable to all signals is of no detriment to the transmission of the facsimile and may be compensated, if desired, as above described in connection with the circuit of Figure 6 supra.

Figure 8 illustrates a simpler form of shock excited oscillator whereby the tube 101 which is a switch tube, is normally drawing current from the B positive supply. The application of a negative signal to the input circuit causes the grid 105 of the tube 101 to drive the tube to cut off. The oscillatory circuit comprising the inductance 102 and capacitor 104 are thrown into oscillation at a frequency determined by these components, resulting in the output of a signal of the desired frequency across the terminals 108. In the particular circuit shown here, the signal in the circuit 108 will die away due to the decrement of the oscillating circuit; if a continued signal is required, however, a sustaining amplifier may be built with the circuit elements 102 and 104 therein so that a train of oscillations is sustained after having been produced as above described.

In the above figures the input circuit has been illustrated as taken from a photoelectric cell. It is to be understood that this is not necessarily the connection that is to be employed; the photoelectric cell output may be used directly as shown or it may be amplified with a suitable amplifier and may, if desired, be subsequently rectified if the amplifier output is of an alternating character. For example, the photoelectric cell shown diagrammatically in Figure 5 at 77 may in fact comprise a 931–a. electron multiplier phototube in an oscillating circuit at 100 kc. or better, the output being suitably rectified to provide the control signals for the transitron or shock excited oscillator shown elsewhere. For transmission over a normal telephone line, for example, the frequency of the transitron oscillator may be in the neighborhood of 2,000 cycles per second; hence the error introduced by the time displacement of the 100 kc. signal in reference to the 2 kc. signal is in the order of 2% and is, for practical purposes, negligible.

In the above figures I have illustrated certain forms of oscillatory circuits or of mechanisms which are adapted to the purpose of carrying into effect the objects of this invention. However, it is to be understood that the scope of the invention is in no manner limited to the particular forms here shown. The invention is concerned with a certain relationship between the phase or time relation of a carrier or subcarrier or similar frequency and the scanning transition of black to white or white to black portions of an original subject copy which is to be transmitted; the devices shown here are illustrative of mechanisms and circuits which may be employed to produce the desired results, but my invention is in no manner circumscribed by the particular embodiments and modifications here shown by way of example and for the purpose of explaining the operation of the invention.

Where the above specification and in the appended claims I have referred to a "transition" it is to be understood that I mean a result of the scansion of a portion of an original subject copy by a beam of light or other suitable means, and in particular that part of the said scansion which comprises the transition during the process from a white part of the original subject copy to a black portion thereof, or the transition during scansion from a black to a white portion of the original subject copy which is to be transmitted.

And where I have referred to the transmission and/or reception of black-and-white material, and to black-and-white original subject copy it is to be understood that I include (for the purposes of this application) material having a sharp tone boundary such as might exist between contrasting shades of gray, for example, as well as the contrast between pure black and pure white (which shades are in practice difficult to obtain). Also the term black-and-white as used here would include contrasting material of other types, as may be constituted by a contrast between shades of sepia, for example, or between shades of any color, or between two or more colors. Since my invention is directed to control of transmission by using a transition from one shade to another as a means for generating a control signal (referred to as a "transition signal") which is generated by a sharp demarcation of tone such as that between black and white, it is clear that any sharp distinction as suggested above or otherwise may be used for the control of the circuit elements discussed. Where I have used such terms as "sharply distinguished tone" or "sharply tone differentiated" and other similar expressions reference is made to the type of transition here discussed and which is for simplicity sometimes referred to as "black-and-white" transition. The invention is not limited to the use of black-and-white material as such.

Having now described my invention and illustrated certain embodiments thereof, I claim:

1. In a device of the class described, means to scan the surface of an original subject copy having sharp tone differentiation and to produce a transition signal therefrom, said scanning means having an optical system including an interrupter adapted to interrupt a beam of light in said optical system in such a manner as to produce a succession of equally spaced light impulses, means to render the interrupter inoperative, and means under the control of said transition signal to render the interrupter operative for interruption of the optical beam.

2. The method of transmitting a facsimile of an original subject copy which comprises scanning said copy by a light beam and producing signals as a result of said scansion, interrupting said light beam at a predetermined frequency, and controlling the interruption of said beam by the signals produced by the scanning process.

3. The method of producing signals for facsimile transmission which comprises passing a beam of light through an interrupter, producing a signal as a result of the scansion of the original subject copy by the light beam, and causing said signal to control the action of the interrupter in accordance with the tone shadings of said copy.

4. In a device of the class described, a fascimile scanner adapted to produce a signal corresponding to a change in tone value of the original subject under scansion, means for producing a succession of impulses, and means cooperating with said scanner and said producing means adapted to control the latter to produce a constant time interval between the occurrence of the scanning signal and the peak value of the first of the succession of impulses.

5. In a device of the class described, a scanning mechanism adapted to produce an electrical impulse at a time dependent upon the time at which a predetermined tone difference is scanned, means for producing an oscillatory signal, and control means for said producing means adapted to cause the latter to produce a first pulse having a predetermined time relationship to the time of the scansion signal.

MAYNARD D. McFARLANE.

(References on following page)

REFERENCES CITED

The following references are of record in the file of this patent:

UNITED STATES PATENTS

| Number | Name | Date |
|---|---|---|
| 1,667,384 | Jenkins | Apr. 24, 1928 |
| 1,691,147 | Clarke | Nov. 13, 1928 |
| 1,704,360 | Jenkins | Mar. 5, 1929 |
| 1,740,352 | Jenkins | Dec. 17, 1929 |
| 1,958,212 | Shore | May 8, 1934 |
| 2,070,312 | Philpott | Feb. 9, 1937 |
| 2,083,245 | Shore | June 8, 1937 |
| 2,138,577 | Gray | Nov. 29, 1938 |
| 2,226,561 | Herold | Dec. 31, 1940 |
| 2,230,097 | Whitaker | Jan. 28, 1941 |
| 2,255,408 | Carlisle | Sept. 9, 1941 |
| 2,274,687 | Ives | Mar. 3, 1942 |
| 2,429,616 | Grieg | Oct. 28, 1947 |
| 2,440,264 | Grieg | Apr. 27, 1948 |

FOREIGN PATENTS

| Number | Country | Date |
|---|---|---|
| 288,237 | Great Britain | Apr. 16, 1929 |
| 479,731 | Great Britain | Feb. 10, 1938 |

OTHER REFERENCES

"The Electrical Experimenter," December, 1917, pages 516–517.

"Proceedings of I. R. E.," February, 1939, pages 88 to 94.

"Proceedings of I. R. E.," February, 1, 1946, pages 54P, 55P and 56P.